United States Patent [19]

Maruyama et al.

[11] Patent Number: 4,992,722
[45] Date of Patent: Feb. 12, 1991

[54] CHARGING CONTROL UNIT AND METHOD FOR MOTOR VEHICLE

[75] Inventors: Toshinori Maruyama; Toshiaki Matsuhashi, both of Kariya, Japan

[73] Assignee: Nippondenso Co., Ltd., Kariya, Japan

[21] Appl. No.: 308,004

[22] Filed: Feb. 9, 1989

[30] Foreign Application Priority Data

Mar. 26, 1988 [JP] Japan .................................. 63-72427

[51] Int. Cl.⁵ .............................................. H02J 7/14
[52] U.S. Cl. ........................................ 322/33; 322/28; 320/61; 320/35
[58] Field of Search ....................... 322/22, 23, 28, 32, 322/33, 34, 39; 320/35, 36, 61, 64, 68; 323/369

[56] References Cited

U.S. PATENT DOCUMENTS

| | | | |
|---|---|---|---|
| 3,718,849 | 2/1973 | Nolan et al. | 320/61 |
| 4,006,397 | 2/1977 | Catotti et al. | 320/35 X |
| 4,071,813 | 1/1978 | Dobkin | 323/226 |
| 4,209,736 | 6/1980 | Reidenbach | 320/35 X |
| 4,237,412 | 12/1980 | Rundlof | 322/28 |
| 4,435,676 | 3/1984 | Morshita | 322/33 |
| 4,594,631 | 6/1986 | Iwaki | 322/33 X |
| 4,686,446 | 8/1987 | Nishimura et al. | 322/322 |
| 4,760,323 | 7/1988 | Naoi | 322/33 |

FOREIGN PATENT DOCUMENTS 2400277 4/1979 France .................................. 322/33

Primary Examiner—Steven L. Stephan
Assistant Examiner—Kristine Peckman
Attorney, Agent, or Firm—Cushman, Darby & Cushman

[57] ABSTRACT

A charging control unit comprises a voltage detecting means including a first and a second resistor connected in series to an output of the armature coil, a third resistor parallelly connected to the second resistor and a temperature detecting element having a temperature coefficient, and a comparator having its one end connected to the second resistor and the other end connected to a reference voltage source.

An arbitrary temperature characteristic can be set by varying the first resistor or the third resistor. At the same time, an arbitrary charging voltage can be set by changing the second resistor without changing the temperature characteristic.

10 Claims, 4 Drawing Sheets

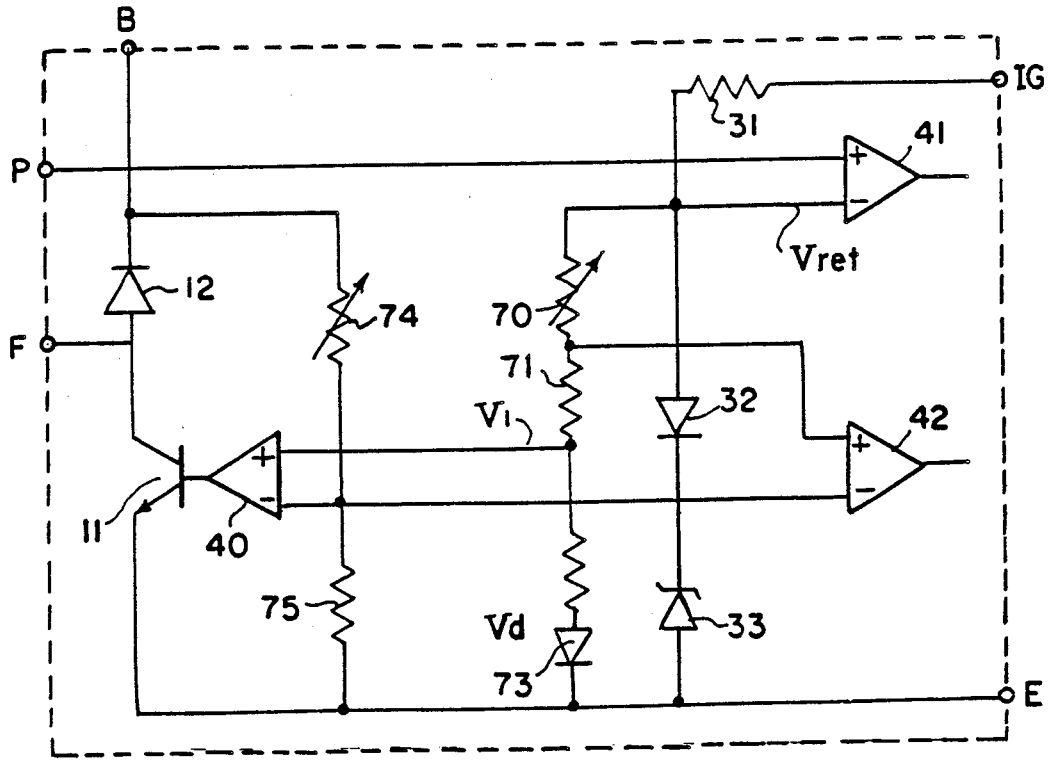
F I G. 7

CHARGING CONTROL UNIT AND METHOD FOR MOTOR VEHICLE

BACKGROUND OF THE INVENTION

1. Field of the Invention

The present invention relates to a motor vehicle charging control unit and method for controlling a voltage generated by a generator in accordance with temperature.

2. Description of Related Art

A conventional charging control unit, as illustrated in FIG. 1, includes resistances 60, 61 and 63, a Zener diode 62 and a transistor 64 by which in some cases a negative temperature characteristic is created in a charging voltage generated by generator 1. See U.S. Pat. No. 3,718,849.

In the prior art charging control unit, a charging voltage VI applied to a battery 5 is given by the following formula in which a base current of the transistor 64 is ignored.

$$V_B = V_{BE}(64) \times [(R_{60}/R_{63}) + (R_{60}/R_{61}) + 1] + V_Z(62) \times [(R_{60}/R_{61}) + 1] \quad (1)$$

where $V_{BE}(64)$ is the base-emitter voltage of transistor 64, $V_Z(62)$ is the breakdown voltage of Zener diode 62, and $R_{60}$, $R_{61}$ and $R_{63}$ are the resistance values of the resistances 60, 61 and 63, respectively.

Next, the temperature characteristic of the charging voltage is obtained by:

$$dV_B/dT = (dV_{BE}(64)/dT) \times [(R_{60}/R_{63}) + (R_{60}/R_{61}) + 1] + (dV_Z(62)/dT) \times [(R_{60}/R_{61}) + 1] \quad (2)$$

As is obvious from formulas (1) and (2), the temperature characteristic $dV_B/dT$ of the charging voltage and the level of the charging voltage $V_B$ itself cannot separately be set. The setting of the temperature characteristic and the charging voltage involves a matching process with respect to resistances 60, 61 and 63. This is a very difficult process requiring many steps.

SUMMARY OF THE INVENTION

It is an object of the present invention to provide a charging control unit and method in which the temperature characteristic can be set separately from the level of the charging voltage at a certain temperature when generating the charging voltage having the temperature characteristic.

It is another object of the present invention to provide a charging control unit and method capable of quickly and accurately generating an alarm signal by generating first and second reference voltages and comparing them an indication of the charging voltage.

These objects are achieved in the present invention by providing a method and apparatus for controlling a generator. According to the present invention, the charging voltage output of a generator is monitored and, based on the output, a signal for controlling the generator is produced. The present invention allows the control signal to be adjusted in a very convenient manner. Specifically, the level of the control signal can be adjusted in a manner independent of temperature characteristics of the control signal, and the temperature characteristic of the control signal can be adjusted independent of the level of the control signal. The generator produces the desired charging voltage in response to the control signal.

The control signal may be generated based upon voltages developed by three resistors and a temperature detecting element. First and second resistors are connected in series to an output of the generator. The third resistor and the temperature detecting element are connected together in series, and together are connected in parallel with the second resistor. The temperature characteristics of the control signal can be adjusted by changing the values of the third resistor while the level of the control signal can be adjusted by changing the value of the second resistor.

A voltage of the second resistor can be compared with a reference voltage to produce the control signal. The output of the generator can be controlled in response to the control signal.

Accordingly, the output charging voltage of the generator is determined by the second and third resistors, in such a manner that the temperature characteristics and the level of the charging voltage at a certain temperature can be adjusted independently of each other.

BRIEF DESCRIPTION OF THE DRAWINGS

FIGURE 7 is an electric circuit diagram showing a comparative example of with the first embodiment.

DETAILED DESCRIPTION OF THE PRESENTLY PREFERRED EXEMPLARY EMBODIMENTS

Figure 2:
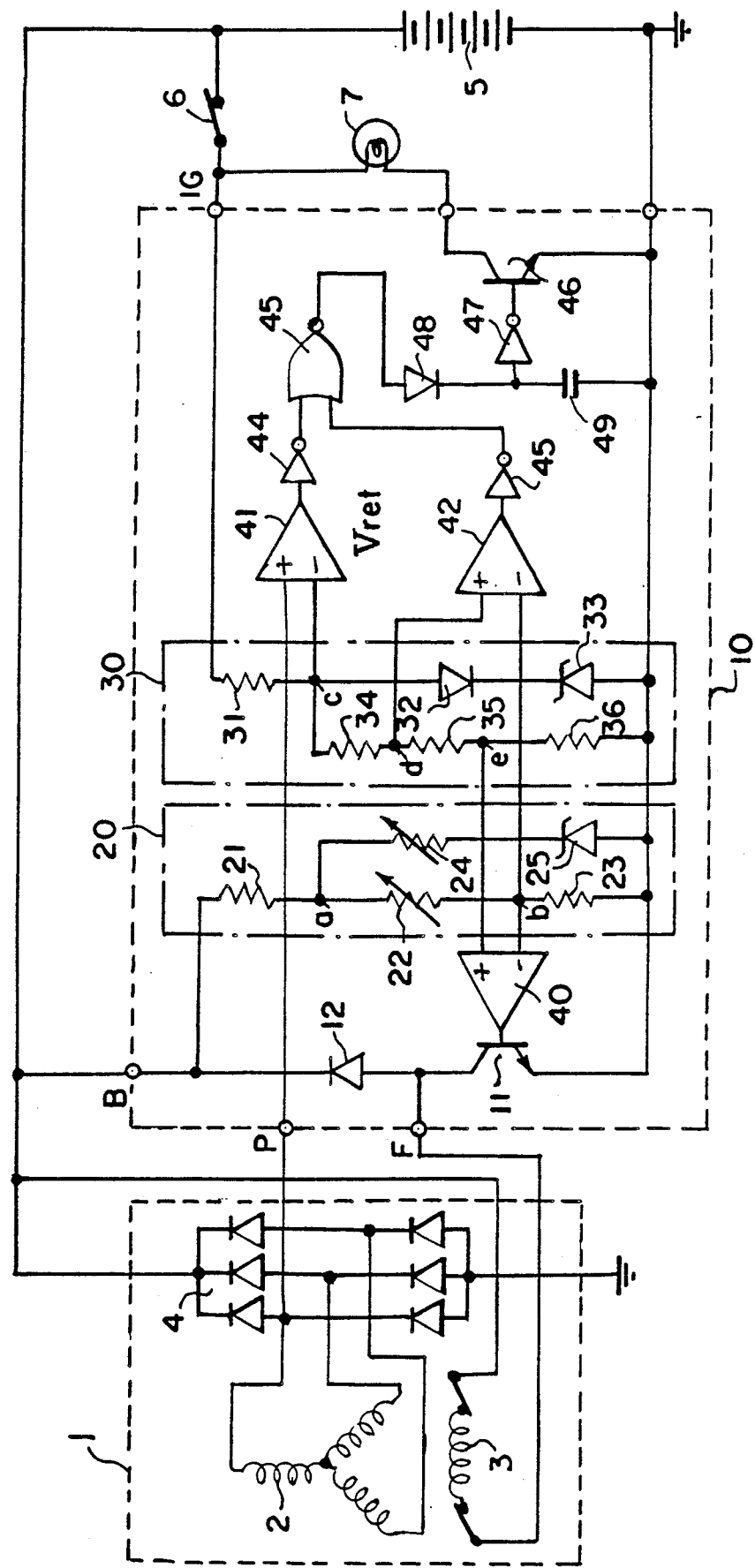
FIG. 2 is an electric circuit diagram illustrating one embodiment of a charging control unit for a motor vehicle according to the present invention.

Several illustrative embodiments of the present invention will hereinafter be described with reference to the accompanying drawings. Referring first to FIG. 2, there is illustrated one embodiment. An AC generator for a motor vehicle generally designated at 1 includes a 3-phase armature coil 2, a field coil 3 and a full-wave rectifier 4. Numeral 5 represents a battery charged by an output of armature coil 2 which is rectified by full-wave rectifier 4 to produce a charging voltage; 6 denotes an ignition switch; and 7 indicates an alarm lamp.

A voltage adjuster, generally indicated at 10, has terminals B, P, F, IG, L and E. Numeral 11 represents an output transistor serving as a switch means, which is connected in series through the terminal F to field coil 3. Numeral 12 represents a free wheel diode for permitting electric current to flow through field coil 3 when output transistor 11 is turned OFF.

Voltage detecting means 20 serves to detect a temperature in the voltage adjuster 10 and also an output voltage of full-wave rectifier 4. Voltage detecting means 20 is composed of: resistance 21 as a first resistor, resistance 22, and resistance 23 as a second resistor which are connected in series between a terminal B and a terminal E; a resistance 24 as a resistor connected in parallel to resistances 22 and 23; and a first Zener diode 25. Resistances 21 to 24 are formed as a thick-film resistor on a substrate.

A reference power source circuit generally indicated at 30 is intended to create a reference value. Circuit 30 includes a series circuit having a fifth resistance 31 connected between a terminal IG and a terminal E, a diode 32 and a second Zener diode 33 and resistances 34 to 36 which are parallelly connected to diode 32 and second Zener diode 33.

A (+) input of a first comparator 40 is connected to a mode e between resistance 35 and resistance 36 of reference power source circuit 30, while a (−) input of comparator 40 is connected to a mode b between resistance 22 and resistance 23 of voltage detecting means 20. The output of first comparator 40 is connected to a base of the output transistor 11 whose output is a control signal for controlling generator 1.

A (+) input of a second comparator 41 is connected to a terminal P connected to one end of armature coil 2, while a (−) input of comparator 41 is connected to a between resistance 31 and resistance 34 of reference power source circuit 30.

A (+) input of a third comparator 42 is connected to a mode d between resistance 34 and resistance 35 of reference power source circuit 30, while a (−) input thereof is, as in the case of first comparator 40, connected to a mode between resistance 22 and resistance 23 of voltage detecting means 20.

An input of a NOR circuit 43 is connected via an invertor 44 to the output of second comparator 41, while the other input thereof is connected via an invertor 45 to the output of third comparator 42.

A transistor 46 for driving a lamp is connected between terminal L connected to a lamp 7 and terminal E. A base of transistor 46 is connected between diode 48 and a capacitor 49 through an invertor 47. An anode of diode 48 is connected to the output of NOR circuit 43.

The next description will be focused on circuit characteristics of reference power source circuit 30. The symbols $r_{21}$ to $r_{24}$ and $r_{34}$ to $r_{36}$ individually represent resistance values of resistances 21 to 24 and resistances 34 to 36 of circuit 30 and voltage detecting means 20. The symbol $V_Z$ denotes a breakdown voltage of Zener diode 25, and Vref designates a reference voltage (between resistance 31 and diode 32) for diode 32 and Zener diode 33.

The values of the above-described resistances and the voltages are exemplified as follows: $r_{21}=3$ kΩ, $r_{23}=3$ kΩ, $r_{34}=3.9$ kΩ, $r_{35}=0.3$ kΩ, $r_{36}=3$ kΩ, and $r_{22}$ and $r_{24}$ are the adjusting resistances; and $V_Z=6.5$V and Vref=7.2V at 25° C. The temperature characteristic of Zener diode 25 is expressed as follows: $dV_Z/dT=2$ mV/°C. The reference voltage Vref does not exhibit any variation with respect to the temperature, because diode 32 is chosen to have a negative temperature characteristic which balances the positive temperature characteristic of Zener diode 33 [dVref/dT = 0mV/°C].

The charging voltage $V_B$ at the terminal B is given by the following formula:

$$V_B = K \times Vref - (r_{21}/r_{24})V_Z \quad (3)$$

(where
$K=[r_{36}/(r_{35}+r_{36}+r_{34})] \times [(r_{23}+r_{22})/r_{23}] \times r_{21} \times [(1/r_{24})+(1/r_{21})+(1/(r_{23}+r_{22}))]$).

The temperature characteristic $dV_B/dT$ is obtained by performing partial differentiation at a temperature T.

$$dV_B/dT = K \times (dVref/dT) - (r_{21}/r_{24}) \times (dV_Z/dT)$$

$$dVref/dT = 0 \quad (4)$$

Hence, $$dV_B/dT = -(r_{21}/r_{24}) \times (dV_Z/dT) \quad (5)$$

When inserting respective parameters, $$dV_B/dT = -(3K\Omega/r_{24}) \times 2mv/°C.$$

If $dV_B/dT$ (i.e., the temperature of $V_s$) is set to −10 mV°C., $r_{24}=0.6$ KΩ.

In this state, $V_B$ can be determined by adjusting $r_{22}$ of resistance 22 without varying $dV_B/dT$. For instance, when $V_B=14.5$V at normal temperature (25° C), in accordance with the formula (3) adjusting resistance 22 is given by: $r_{22}=4.333$ KΩ.

Figure 3:
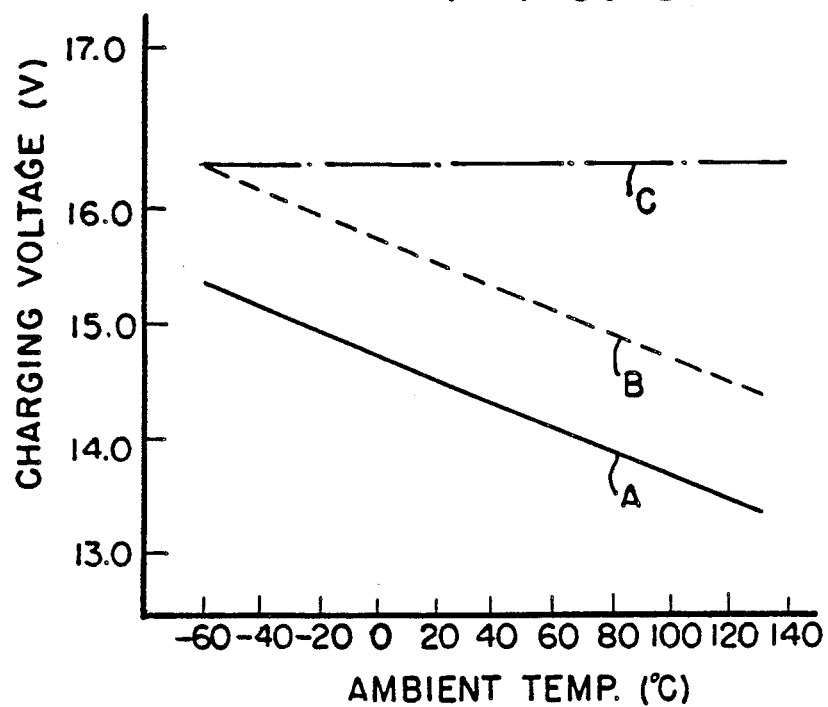
FIG. 3 is a characteristic diagram showing charging voltages with respect to ambient temperatures of a voltage adjuster according to the embodiment of FIG. 2.

Please now refer to FIG. 3, which is the characteristic diagram of the circuit of FIG. 2. As indicated by a straight line A the output voltage of the AC generator 1 can be adjusted with an inclination of −10mV/° C. according to the temperatures in voltage adjuster 10.

To start with, fourth resistance 24 is trimmed, and the temperature characteristic is then determined. It is therefore possible to set the charging voltage by trimming second resistance 22 without changing the temperature characteristic. The same effects can be obtained also by adjusting the resistance 21 instead of the resistance 24 and the resistance 23 in place of the resistance 22. As can be understood from the formulae (3) and (5), the same effects can be acquired, even if there exists no resistance 22 ($r_{22}=0\Omega$).

Since first, second, third and fourth resistances 21–24 are formed as a thick-film resistor, voltage adjuster 10 can be protected from ignition pulse surges.

It is also possible to set the adjusting voltage by trimming resistances 34–36 or adjusting reference voltage Vref instead of adjusting resistance 24 without changing the temperature characteristic. Since resistances 34–36, however, have to be formed not as a semiconductor's resistance in a monolithic IC but as a thick-film resistor which can be trimmed, some faults exist. For example, the size of the regulator integrated circuitry is increased and the number of connecting terminals between the monolithic IC and thick-film resistors is increased.

Based on the foregoing arrangement, the temperature characteristic dVref/dT of the reference voltage Vref is set to 0mV/° C. by virtue of the matching temperature characteristics of diode 32 and Zener diode 33. However, the temperature characteristic is varied in some cases, due to variations in the temperature characteristics of the diode and the Zener diode from one diode to the next. Now it is assumed that the temperature characteristic is −1mV/° C.

In the case of determining the charging voltage after setting the temperature characteristic, a variation modulus of the temperature characteristic with respect to the charging voltage is expressed such as: $d(dV_B/dT)/dV_B$.

From the formulae (3) and (4), $$dV_B/dT=[(V_B-(r_{21}/r_{24})\times V_Z)/Vref]\times(d- Vref/dT)-(r_{21}/r_{24})\times(dV_Z/dT) \quad (6)$$

Then, $$d(dV_8/dT)/dV_B(dVref/dT)/Vref = -0.14\ (mV/°C./V)$$

FIG. 7 shows a comparative example where the temperature characteristic circuitry is connected to the reference voltage in connection with the first embodiment. In FIG. 7 at a (−) terminal of first comparator 40, resistances 74 and 75 are adjusted, while a (+) terminal thereof is connected between resistances 71 and 72 of a series circuit consisting of resistances 70, 71 and 72 and a diode 73.

In this circuit also, as in the first embodiment, the charging voltage and the temperature characteristic are obtained.

$$Vref = 7.2V \text{ and } dVref/dT = 0mV/°C.$$

As an example the resistance value of the resistance 72 is $r_{72}=2.3$ KΩ; the resistance value $r_{71}$ of the resistance 71 is $r_{71}=0.3$ KΩ; the resistance value of the resistance 75 is $r_{75}=3$ KΩ; and the interanode/cathode voltage of the diode 73 is Vd = 0.7V and dVd/dT = −2mV/° C.

The charging voltage $V_B$ and the temperature characteristic $dV_B/dT$ are obtained by the following equations.

$$V_8 = k_1 \times [r_{72} \times Vref + (r_{71} + r_{70}) \times Vd] \quad (7)$$

$$dV_8/dT = k_1 \times [r_{72} \times (dVref/dT) + \quad (8)$$
$$(r_{71} + r_{70}) \times (dVd/dT)]$$

$$k_1 = (r_{74} + r_{75})/[r_{75} \times (r_{71} + r_{72} + r_{70})] \quad (9)$$

$$dV_8/dT = [V_8/(r_{72} \times Vref + (r_{71} + r_{70}) \times Vd) \times$$
$$[r_{72} \times (dVref/dT) + (r_{71} + r_{70}) \times (dVd/dT)]$$

$$dV_8/dT = [V_8/(r_{72} \times Vref + (r_{71} + r_{70})Vd] \times$$
$$(r_{71} + r_{70}) \times (dVd/dT)$$

Hence, it is apparent from the aforementioned formulae that both the charging voltage $V_B$ and the temperature characteristic $dV_B/dT$ are dependent on the same resistance values and therefore cannot be independently set.

By thoroughly matching the above-described resistances, the charging voltage is given by:

$$V_B = 14.5V$$

and $$dV_B/dT = -10mV/°C.$$

then, $$r_{70} = 7.3\ KΩ$$

As described above, assuming that the temperature characteristic dVref/dT with respect to Vref becomes −1mV/° C., $$\begin{aligned}
d(dV_8/dT)/dV_8 &= [r_{72}\times(dVref/dT)+(r_{71}+r_{70})\times\\
&\quad (dVd/dT)]/[r_{72}\times Vref + (r_{71}+r_{70})\times Vd]\\
&= -(2.3 + 7.2 \times 2)/(2.3 \times 7.2 + 7.2 \times 0.7)\\
&= -0.77(mV/°C./V)
\end{aligned}$$

Therefore, a value of 0.77 (mV/° C./V) is relatively large as compared to a variation modulus of −0.14 (mV/° C./V) of the temperature characteristic in the first embodiment, with the result that an accurate temperature characteristic cannot be obtained in the comparative example.

In the above-described first embodiment, the function of voltage adjuster 10 will next be explained in brief.

When closing ignition switch 6, generator 1 does not yet generate an output, and hence a voltage at terminal P is lower than reference voltage Vref. Then, second comparator 41 gives forth a low output. Similarly, third comparator 42 produces a high output, because an electric potential at point b is low. As a result, NOR circuit 43 gives forth a low level output, but the output assumes a high level through an invertor 47, thereby making a lamp driving transistor 46 conductive. Lamp 7 is then lit up. Subsequently, the driver is informed of the fact that generator 1 does not yet produce electric power. Capacitor 49 is intended to smooth an AC output of armature coil 2.

Thereafter, generator 1 begins to generate electricity, whereby the output at terminal P exceeds reference voltage Vref. The output level of second comparator 41 becomes high, and the output of NOR circuit 43 also assumes high level. Therefore, the level of output of invertor 47 is lowered, and lamp driving transistor 46 is turned OFF, thus extinguishing lamp 7.

The voltage adjustment is, as explained earlier, performed so that the charging voltage is set to 14.5 (V) at normal temperature (25° C.). If the temperature in voltage adjuster 10 is higher than the normal temperature, the charging voltage is varied by −10mV/° C. If the voltage at terminal B (output voltage of the generator) is smaller than the charging voltage, the output level of first comparator 40 becomes high, thereby putting output transistor 11 into a conductive state to generate a control signal. Then the control signals causes current to flow through field coil 3, and the output voltage is thereby increased. The output voltage is controlled to the foregoing charging voltage by turning ON/OFF output transistor 11 by means of first comparator 40.

If output transistor 11 is short-circuited or if the grounding of the field coil 3 becomes faulty, it is impossible to control output transistor 11 by use of first comparator 40, with the result that the output voltage of generator 1 sharply increases and battery 5 undergoes overcharging.

When the output voltage is in excess of the second reference voltage (higher, as indicated by straight line B of FIG. 3 by approximately 1V than the charging voltage indicated by straight line A), the output level of third comparator 42 becomes low. NOR circuit 43 outputs a low level. The lamp driving transistor 46 is made conductive through invertor 47. The conduction of transistor 46 permits lamp 7 to be lit up, whereby the driver is informed of the fault.

As shown in FIG. 3, an abnormal condition is indicated only when the output voltage exceeds the second reference voltage indicated by straight line B which follows the temperature characteristic of the charging voltage (straight line A) in the present invention. It is therefore feasible to restrain the overcharging of battery 5 by giving an invariably accurate abnormal alarm for the respective temperatures. In sharp contrast with this, if the second reference voltage does not vary with temperature, the reference voltage would be characterized by straight line C in order to surely give the abnormal alarm at low temperatures. For this reason, when the typical temperature in voltage adjuster 10 falls within a range of 80° C. to 120° C., there is a big difference in the charging voltage between straight lines A and C. When the abnormal alarm is triggered in response to line C, a good deal of time is needed to reach that level, resulting in overcharging of the battery.

Figure 4:
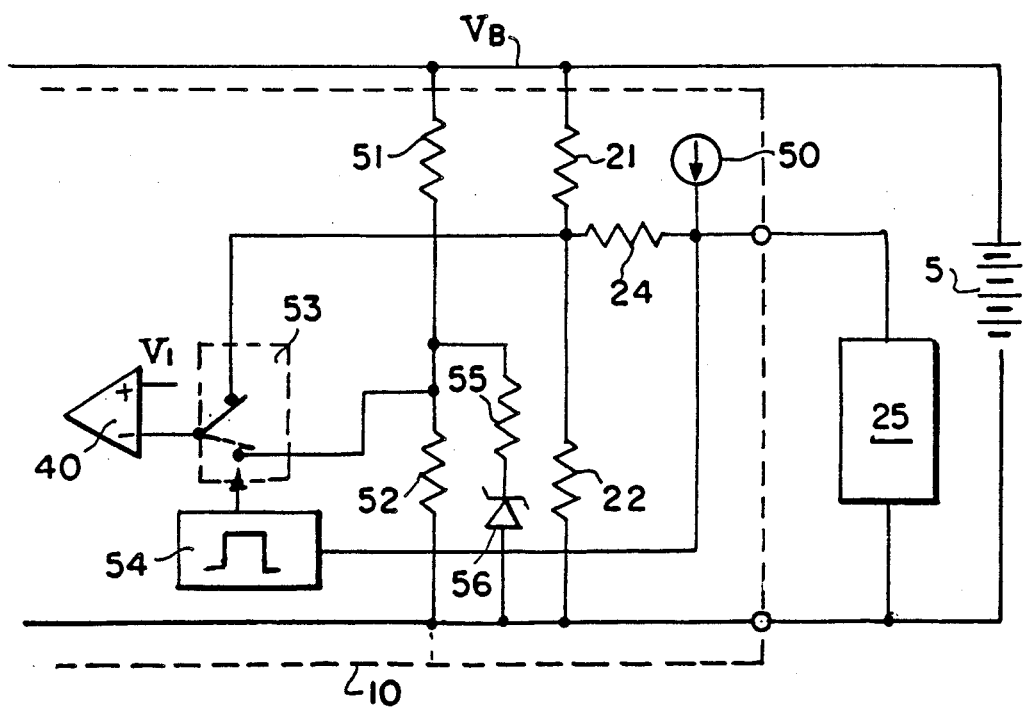
FIG. 4 is an electric circuit diagram illustrating a second embodiment of a motor vehicle charging control unit according to the present invention.

A second embodiment will now be described with reference to FIG. 4.

In the second embodiment, the charging voltage corresponding to an outside temperature (e.g., temperature of battery 5) can be determined by separating only temperature detecting element 25 from voltage adjuster 10. Where temperature detecting element 25 involves the use of an element (e.g., Zener diode) having less current dependency, it is feasible to compensate for a leakage current between the terminals of temperature detecting element 25 by employing a current source 50.

Temperature detecting element 25 can be a temperature sensor as shown in U.S. Pat. No. 4,071,813 instead of the Zener diode.

Where temperature detecting element 25 is positioned near battery 5, it can be considered that temperature detecting element 25 will be removed or short-circuited for some reason. In such a case, the voltage of temperature detecting element 25 is detected by a window comparator 54. If the detected value exceeds a predetermined range, protection can be provided at the abnormal time by a change-over to another voltage detecting circuit (resistances 51, 52, 55 and Zener diode 56) which is not influenced by temperature detecting circuit 25.

That is, during abnormal conditions, the output voltage of AC generator 1 can be adjusted according to the temperatures in voltage adjuster 10 instead of temperatures around battery 5.

Figure 1:
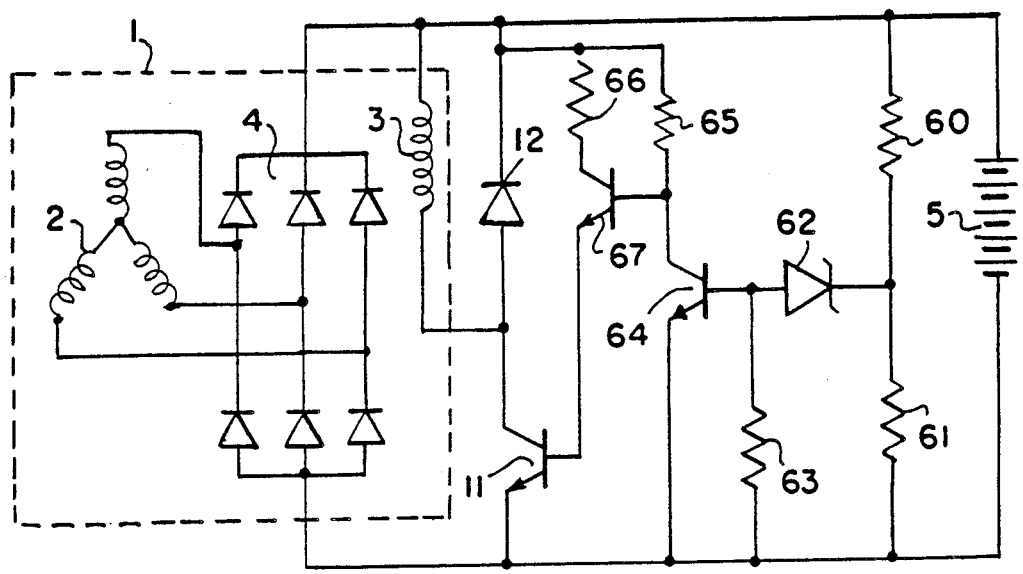
FIG. 1 is an electric circuit diagram depicting a conventional motor vehicle charging control unit.

In the prior art circuit depicted in FIG. 1, elements 60 to 64, which will exert influences on the temperature characteristic, would be required to be separated from voltage adjuster 10 to provide an indication of battery temperature. Therefore, a required number of terminals has to be more than 3, which causes a problem of providing a more complicated circuit. In accordance with the present invention, it is enough to dispose only the temperature detecting element outwardly of adjuster 10, whereby the circuit can also be simplified.

Figure 5:
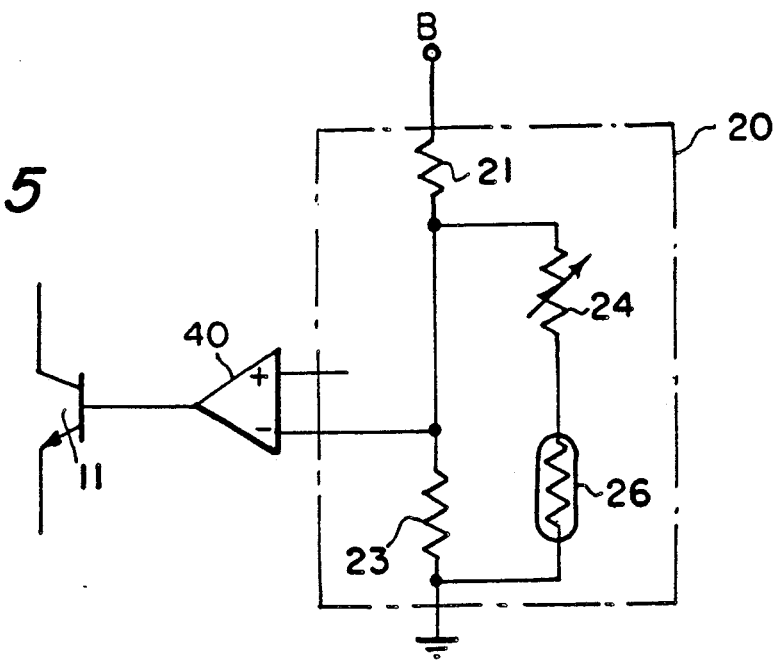
FIG. 5 is an electric circuit diagram illustrating a third embodiment of a motor vehicle charging control unit according to the present invention.

A third embodiment will be described with reference to FIG. 5. In the third embodiment, a silicon PTC thermistor 26 is used instead of Zener diode 25.

The charging voltage $V_B$ at the terminal B is given by the following formula:

$$V_B = Vref \times [1 + (R_{21}/R_{23}) + (R_{21}/R_{24} + R_{26})] \quad (10)$$

The temperature characteristic $dV_B/dT$ is $$-Vref \times R_{21}/(R_{24} + R_{26})^2] \times (dR_{26}/dT) \quad (11)$$

For instance, the resistance of the silicon PTC thermistor may be 0.65 KΩ at −25° C, 0.98 KΩ at 25° C. and 1.4 KΩ at 75° C.

Figure 6:
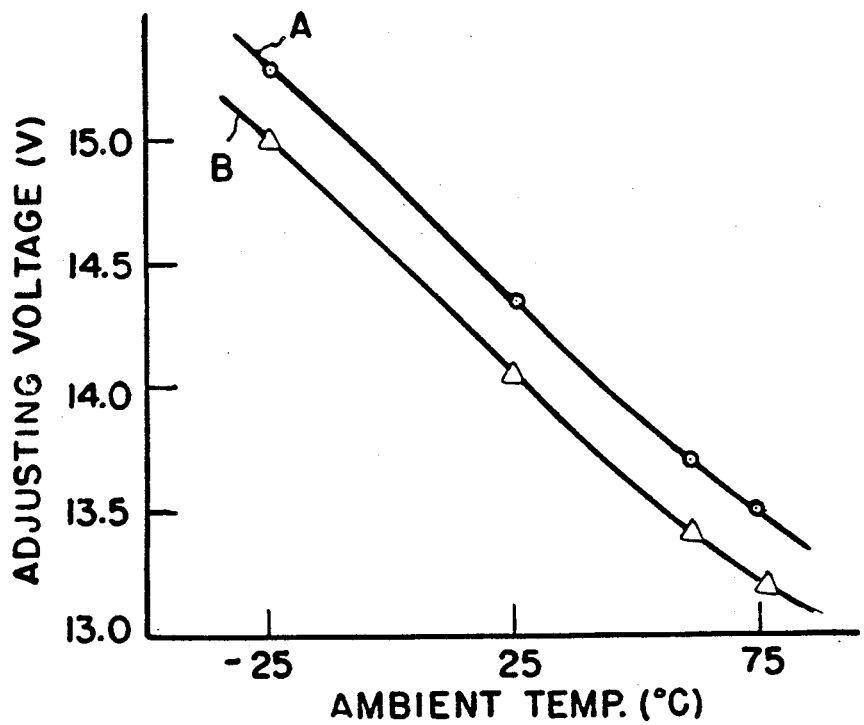
FIG. 6 is a characteristic diagram showing charging voltages with respect to ambient temperatures of a voltage adjuster according to the embodiment of FIG. 5.

Accordingly, the temperature characteristic becomes nonlinear as shown in FIG. 6. In FIGURE 6, a curve A shows the temperature characteristic when $R_{23}$ is 1.11 KΩ, and a curve B shows the same characteristic when $R_{23}$ is 1.15 KΩ.

In general, it is a common practice that the charging voltage for battery 5 decreases when the temperature rises in voltage adjuster 10. For this reason, as can be understood from the formula (4), the temperature detecting element 25 includes Zener diode having a positive temperature characteristic, thereby producing the negative temperature characteristic. Inversely, if a diode, having a negative temperature characteristic, is employed, a positive temperature characteristic can be provided from formula (4).

Also, fourth resistance 24 may be switched with temperature detecting element 25.

In the first embodiment, the adjustment of temperature characteristic requires variations in fourth resistance 24. First resistance 21 may, however, be varied. The charging voltage is adjusted by changing second resistance 22. Third resistance 23 may, however, be changed.

What is claimed is:

1. Apparatus for controlling a generator producing an output in response to a control signal comprising:
   means for generating a control signal for regulating an output of a generator;
   means for adjusting a temperature characteristic of said control signal;
   means for adjusting the level of said control signal independently of the temperature characteristic of said control signal;
   and
   means for controlling said generator in response to said control signal.

2. Apparatus for controlling a generator producing an output in response to a control signal comprising:
   voltage detecting means for monitoring an output from a generator, said voltage detecting means including first and second resistors connected in series and adapted to be connected to said output, and a third resistor and a temperature detecting element connected together in series, said series connected third resistor and temperature detecting element being connected in parallel with said second resistor;
   means for comparing a voltage of said second resistor with a reference voltage and producing a comparison signal; and
   means for generating a control signal in response to said comparison signal.

3. A charging control unit for a motor vehicle, comprising:
   an AC generator having an armature coil and a field coil;
   a battery charged by an output of said armature coil;
   voltage detecting means including first and second resistors connected in series to said output of said armature coil, and a third resistor and a temperature detecting element connected together in series, said series connected third resistor and temperature detecting element being connected in parallel with said second resistor;
   a switch connected in series to said field coil; and comparing means, having one input connected to said second resistor of said voltage detecting means and another input connected to a reference voltage source, for controlling said switch.

4. A charging control unit for a motor vehicle, as set forth in claim 3, wherein said temperature detecting element includes a Zener diode having a positive temperature characteristic.

5. A charging control unit for a motor vehicle as set forth in claim 3, wherein said temperature detecting element is disposed proximate to said battery for temperature detection thereof, a remaining portion of said voltage detecting means and aid comparing means being remote from said battery.

6. A charging control unit for a motor vehicle, comprising:
an AC generator, having a field coil and an armature coil, for charging a battery by rectifying an output of said armature coil;
a reference voltage first reference voltage and a second reference voltage higher than said first reference voltage;
voltage detecting means including a series circuit of first and second resistors which are connected to said battery, and another series circuit of a third resistor parallelly connected to said second resistor and of an element having a temperature characteristic;
current controlling means for controlling an electric current flowing through said field coil in order to make a voltage of said second resistor of. said voltage detecting means coincident with said first reference voltage from said reference voltage source; and
alarm signal generating means for outputting an alarm signal when said second resistor voltage of said voltage detecting means exceeds said second reference voltage from said reference voltage source.

7. A charging control unit for a motor vehicle. as set forth in claim 6, wherein said temperature detecting element includes a Zener diode having a positive temperature characteristic.

8. A charging control unit for a motor vehicle as set forth in claim 6, wherein said temperature detecting element is disposed proximate to said battery for temperature detection thereof, a remaining portion of said voltage detecting means, said reference voltage source and said current controlling means being remote from said battery.

9. A charging control unit for a motor vehicle as set forth in claim 6, wherein said reference voltage source includes a series circuit of a diode and a Zener diode and means for dividing voltage produced across said diode and said Zener diode to generate said first and second reference voltages.

10. A method of controlling a generator in a manner dependent on temperature comprising:
generating a control signal for regulating an output of a generator;
adjusting a temperature characteristic of said control signal;
adjusting a level of said control signal independent of said temperature characteristic of said control signal; and
controlling said generator in response to said control signal.

* * * * *